United States Patent
Mikla et al.

(10) Patent No.: US 6,699,519 B2
(45) Date of Patent: Mar. 2, 2004

(54) AMYLOPECTIN-CONTAINING FOOD PRODUCT AND METHOD OF PRODUCING THE SAME

(75) Inventors: Ondrej Mikla, Langenlebarn (AT); Dietmar Grüll, Langenschönbichl (AT)

(73) Assignee: Südzucker Aktiengesellschaft Mannheim/Ochensenfurt, Mannheim (DE)

( * ) Notice: Subject to any disclaimer, the term of this patent is extended or adjusted under 35 U.S.C. 154(b) by 160 days.

(21) Appl. No.: 09/894,677

(22) Filed: Jun. 28, 2001

(65) Prior Publication Data

US 2002/0064590 A1 May 30, 2002

Related U.S. Application Data

(63) Continuation of application No. PCT/AT99/00287, filed on Nov. 23, 1999.

(30) Foreign Application Priority Data

Dec. 28, 1998 (AT) ............................................... 2168/98
Sep. 9, 1999 (AT) ............................................... 1550/99

(51) Int. Cl.[7] ............................ A23L 1/01; A23L 1/216
(52) U.S. Cl. ....................... 426/438; 426/466; 426/578; 426/637; 426/638
(58) Field of Search ................................. 426/578, 438, 426/637, 638, 661, 466

(56) References Cited

U.S. PATENT DOCUMENTS

| | | | |
|---|---|---|---|
| 3,519,432 A | | 7/1970 | Succo et al. |
| 5,328,704 A | | 7/1994 | Ritch |
| 5,824,798 A | * | 10/1998 | Tallberg et al. ............. 536/128 |
| 6,541,060 B2 | * | 4/2003 | Jeffcoat et al. ............. 426/578 |
| 2003/0087006 A1 | * | 5/2003 | Buwalda et al. .............. 426/94 |

FOREIGN PATENT DOCUMENTS

| | | | |
|---|---|---|---|
| GB | 2 347 840 | * | 9/2000 |
| WO | WO 97/03573 | | 2/1997 |

* cited by examiner

*Primary Examiner*—Nina Bhat
(74) *Attorney, Agent, or Firm*—Laurence A. Greenberg; Werner H. Stemer; Gregory L. Mayback

(57) ABSTRACT

The novel food product is based on, or contains, potatoes that are finished by deep-frying, frying or baking with the addition of fat and/or fat substitutes. The potato starch contained in the food product at least partially consists of a potato starch having a content of at least 95%, preferably at least 98%, of amylopectin. The food products are characterized by a fat and/or fat substitute content that is reduced by up to 30% as compared to conventional products of this type.

16 Claims, 1 Drawing Sheet

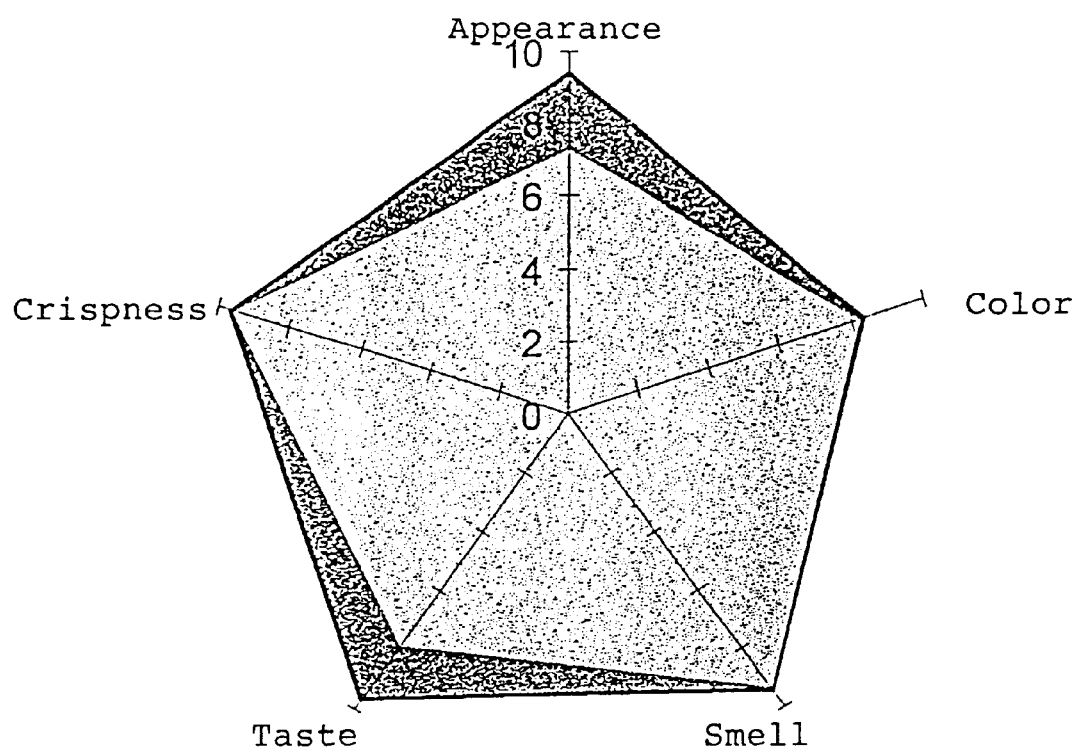

AMYLOPECTIN-CONTAINING FOOD PRODUCT AND METHOD OF PRODUCING THE SAME

CROSS-REFERENCE TO RELATED APPLICATION

This application is a continuation of copending International Application No. PCT/AT99/00287, filed Nov. 23, 1999, which designated the United States.

BACKGROUND OF THE INVENTION

Field of the Invention

The present invention relates to a food product based on, or containing, potatoes that is prepared by deep frying, frying or baking with the addition of fat and/or fat substitutes.

The invention also relates to a method of producing such food products, and to the use of these methods for producing potato chips, snacks, French fries, potato croquettes, potato pancakes, and similar products.

The expression food product based on or containing potatoes in the instant context refers to a product for the production of which potatoes in their original form as well as in processed form, such as powderized potatoes or potato starch, have been used.

Frequently, potatoes are processed to different food products, which are made ready for consumption by deep frying, baking or frying in hot fat and/or fat substitutes. The products known best and maybe most widely used are potato chips and French fries, which have typical sizes and shapes. Moreover, products of other sizes and shapes are known, such as strips, cubes, grated pieces etc. Usually, these products are produced by cutting pealed potatoes and reducing them to fragments. These potato pieces may be preserved by pre-treating them by various known method steps, such as blanching, microwave heating, pre-deep-frying, pre-baking etc., and may be stored appropriately packed until further processing. It is also possible to deep-fry these potato pieces, with or without pre-treatment, in hot fat and/or fat substitutes at temperatures of from 160° C. to 200° C., for different periods of time, such as between 2 and 10 minutes, as required.

Depending on the variety and growing conditions, the moisture of the raw potatoes will range between 75% and 85%. If potato pieces containing this amount of water are deep-fried in hot fat and/or fat substitutes, the water will be made to boil immediately, and the vaporized water will emerge explosively from the deep-fried potato pieces. This will lead to the formation of many small holes and apertures in the products. As a consequence of the bath consisting of fat and/or fat substitutes, a considerable amount of fat and/or fat substitutes will remain adhered to the surface of the products. In addition, when removing the products from the hot bath of fat and/or fat substitutes, a vacuum suction effect will be created in the small cavities on account of cooling, which will lead to a further absorption of fat and/or fat substitutes by the product. Depending on the size and the specific surface, the deep-fried products may contain between 10% and 40% and even more of fat and/or fat substitutes.

The content of fat and/or fat substitutes of such products in most instances is undesired for various reasons. On the one hand, fat is a food component rich in calories, harboring the known health risks when consumed in excessive amounts. It is in the interest of part of the population to highly reduce the supply of calories and fats in their diet. This means that from the point of view of correct nutrition, it is particularly important to keep the fat content of foods or food products as low as possible. On the other hand, the fat substitutes presently known are synthetically prepared materials which have side effects on the gastrointestinal system (Jacobson, M. F.; Brown, M. A.; Whorton, E. B. Jr.; Cheskin, L. J.; Zorich, N.; Miday, R.; Filloon, T.: Gastrointestinal symptoms following olestra consumption. Journal of the American Medical Association, (1998) 280 (4) 325–326) and have a negative effect on the absorption of fat-soluble vitamins (Schlagheck, T. G.; Kesler, J. M.; Jones, M. B.; Zorich, N. L.; Dugan, L. D.; Davidson, M. H.; Peters J.C.: Olestra's effect on vitamin D and E in human can be offset by increasing dietatry levels of these vitamins, Journal of Nutrition (1997), 127 (8s, Assessment of the nutritional effects of olestra), 1666S-1685S), and of other fat-soluble nutritive components (Schlagheck, T. G.; Riccardi, K. A.; Zorich, N. L.; Torri, S. A.; Dugan, L. D.; Peters, J. C.: Olestra dose response on fat-soluble and water-soluble nutrients in humans. Journal of Nutrition (1997) 127 (8s, Assessment of the nutritional effects of olestra) 1646S-1665S). An excessive consumption of fat substitutes in normal consumers and a moderate consumption in sensitive consumers may have a laxative effect. For this reason, the reduction of these substances in food products also is highly important.

From an economic point of view, fat and fat substitutes are relatively expensive raw materials, and are, of course, reflected in the price of the subject products. Thus, it is in the interest of the producers and of the consumers not to have to either sell or buy and consume unnecessary fat, or an unnecessary fat substitute, respectively, with the products.

Moreover, a high content of fat and/or of fat substitutes involves a fatty, greasy sensation which is less and less acceptable to consumers. On the other hand, there are also products which are prepared entirely or almost entirely without any fat, yet on account of their poor sensory quality they are not readily accepted by the consumers.

Therefore, there have been intensive efforts for quite some time to reduce the fat content of deep-fried potato products, wherein an optimization of the production technology has always been in the foreground.

For instance, British patent No. 1,133,929 describes a method of producing potato chips in which the cut potato slices are deep-fried at 150° C. (300° F.) to an extent at which a relatively high moisture is still retained in the chips, whereupon they are dried by dry air under sub-atmospheric pressure.

According to the method described in U.S. Pat. No. 4,537,786, the potato chips, after having been deep-fried at between 138° C. and 160° C. (280° F. -320° F.), are dried within 10 seconds after having been removed from the hot oil bath, in a flow of hot air (177° C., 350° F.) for up to 10 min to a residual moisture of 10%.

U.S. Pat. No. 4,277,510 describes a method in which peeled, cut potatoes having a moisture of 70% are dried by means of warm air to a residual moisture of from 30% to 65% and subsequently are deep-fried in hot oil.

According to British patent No. 1,519,049, the conventionally deep-fried potato chips are treated with super-heated steam so as to remove surface fat.

According to U.S. Pat. No. 3,627,535, after the deep-frying of deep-frozen French fries in hot fat, a further treatment with saturated steam is suggested so as to reduce their fat content.

With the methods discussed in these patent specifications, a reduction of the fat content of potato chips and/or French fries by up to 30% is attainable.

All these methods, however, involve supplementary technological measures in addition to the common production of, e.g., potato chips or French fries, necessitating increased investments and an increased material consumption. The sensory quality of the products is not equal to the quality of standard products having the full fat content.

SUMMARY OF THE INVENTION

The object of the present invention is to provide a food product and a method of producing the food product which overcomes the above-noted deficiencies and disadvantages of the prior art devices and methods of this general kind, and which produces deep-fried, fried or baked food products of the above-mentioned type, in which a fat and/or fat substitute reduction is obtained without complex additional method steps.

With the above and other objects in view there is provided, in accordance with the invention, a food product containing potatoes, finished by deep-frying, frying or baking with an addition of fat and/or fat substitutes, the food product at least partially containing a potato starch having an amylopectin content of at least 95%, and the potato starch contained in the food product being at least partially derived from potatoes in which amylose formation has been suppressed by breeding, by a molecular biological method or by a genetic engineering method.

According to the present invention, the above-indicated object is achieved by taking a completely different approach to this problem, i.e. by achieving the reduction of the fat and/or fat-substitute absorption of deep-fried, baked or fried potato products by using special potatoes as raw material. The food product according to the invention is characterized in that the potato starch contained therein at least partially consists of a potato starch having a content of at least 95%, preferably at least 98%, of amylopectin.

As defined above, this is achieved in that the potato starch contained in the food product is derived from potatoes in which the formation of amylose has been suppressed by breeding or by molecular-biological or genetical engineering methods.

When deep-fried, baked or fried in fat and/or fat substitutes, such food products are characterized by a content of fat and/or fat substitutes which is reduced by up to 30% as compared to conventional products of this type.

The dry substance of potato tubers mainly consists of polysaccharides which are known as starch and constitute up to 75% of the dry substance of potatoes. In conventional potatoes, the starch essentially consists of two chemically differently structured molecules, called amylose and amylopectin. From the chemical point of view, both substances consist of several thousand linked glucose molecules. Amylose is characterized by a nearly unbranched linear structure of linked glucose units. In amylopectin, numerous shorter molecules of amylose-like structure are bound to a larger, branched structure. Common potato starch contains 78% of amylopectin and 22% of amylose on an average. The application-technological properties of the potatoes are substantially determined by the properties of the starch contained therein.

In recent years, new genotypes have been created by cross-breeding and by targeted interventions in the genome of the potato, these genotypes having a starch composition clearly different from common starch. Thus, transgenic potato genotypes have been created which contain a new potato starch consisting of up to 98% of amylopectin. This new type of starch has different application-technological properties as compared to conventional starch, which is advantageous in some fields of application. However, it was not to be expected that products made of transgenic potatoes whose starch consisted of at least 95% of amylopectin, preferably of 98% of amylopectin, when deep-fried in hot fat and/or fat substitutes, would absorb up to 30% less fat and/or fat substitutes than comparable products produced from conventional potatoes. This result is obtained without having to take additional special and complex technological steps in the production of potato products. For instance, fat-reduced and/or fat-substitute-reduced potato chips can be produced by common production technology. This phenomenon can be explained by the fact that on account of their special starch composition, fewer cavities are formed on the surface of the products during deep-frying of the latter, and thus, as a consequence, less fat and/or fat substitute is absorbed by the products.

The clear advantage of using these novel potatoes in the production of deep-fried potato products is found in the economic field, on the one hand, because less fat and/or fat substitute is consumed during the production process, and in the field of health, on the other hand, because when eating such products, less fat and/or fat substitutes are ingested. A third, not inessential advantage consists in that the sensory quality of the products is enhanced since these products look, taste and feel less greasy.

It is pointed out that the new potato-containing foodstuffs need not exclusively be produced by using the novel potato, but that also a mixture of conventional potato starting materials will lead to a respective reduction of fat and/or fat substitutes.

The reduction of the content of fat and/or fat substitutes of potato-containing foodstuffs by using the above-mentioned genetically modified potato in the most varying forms or by admixing this potato to conventional potatoes may, advantageously, apply to the following product groups which are all made ready for consumption by deep-frying, baking or frying in fat and/or fat substitutes:

potato chips and similar snack articles of various sizes and shapes, entirely or partially made of potatoes and/or the dehydrated forms thereof, French fries and similar products of various sizes and shapes, entirely or partially made of potatoes and/or the dehydrated forms thereof, potato croquettes and similar products of various sizes and shapes, entirely or partially made of boiled, mashed potatoes and/or the dehydrated forms thereof, potato pancakes and similar products of various sizes and shapes, entirely or partially made of potatoes and/or the dehydrated forms thereof, food products finished by deep-frying, baking or frying, containing dried potato pieces, potato granules, powderized potatoes and/or potato starch as components thereof, and comprising vegetables, cereal products, proteinaceous foodstuffs and the like as the remaining components.

The following example and the results of the physical and sensory tests show the advantageous application of these transgenic potato genotypes for the preparation of fat-reduced potato chips.

BRIEF DESCRIPTION OF THE DRAWING FIGURE

The sole FIGURE shows a sensory test diagram.

DETAILED DESCRIPTION OF AN EXAMPLE

The FIGURE illustrates a diagram showing the results of a sensory test with an example of the invention in juxtaposition with a conventional product. The test was based on ISO standard 11035.

Test Products:

From the above-discussed transgenic potato genotypes, potato chips were prepared in the laboratory. As the standard, potato tubers of a conventional variety called Desiree were used. As test objects, also potato tubers of the variety Desiree were used, which had been genetically modified such that the starch contained in the tubers consisted of 98% of amylopectin.

The potato tubers were washed, peeled, and cut to slices having a thickness of 1.5 mm by using a vegetable cutter. The potato slices were deep-fried for 2 minutes in a closed deep-fat fryer in hot fat having a temperature of 190° C. After their removal from the fat, the chips were allowed to drain and to cool.

To examine the fat content, the chips samples were reduced to fragments, and the fat was extracted from the samples with petroleum ether in a Soxhlet apparatus and gravimetrically determined. The results of the fat determination are summarized in Table 1.

TABLE 1

| Potato genotype | Desiree conventional | Desiree transgenic |
|---|---|---|
| Fat content based on dry substance | 42.02% | 28.84% |

After having been stored for 24 h, the potato chips were subjected to a sensory analysis, using a panel test employing trained panelists, using ISO standard 11035 "Sensory analysis—Identification and selection of descriptors for establishing a sensory profile by multidimensional approach", by means of a rating scale comprising 10 points, 1 point denoting the most negative rating and 10 points denoting the most positive rating of the subject characteristic. Sensory characteristics, such as appearance, color, smell, tast and crispness were included in the analysis, and on the basis of the results, a so-called sensory profile of the test products was established which can be seen in the diagram of the FIGURE.

As apparent from Table 1, the potato chips from transgenic Desiree had a markedly lower fat content than the chips from conventional Desiree. In the sensory examination, both chips samples received comparable ratings with regard to the characteristics color, smell and crispness, whereas regarding the characteristics taste and appearance, the samples from transgenic Desiree received a markedly higher rating, which clearly could be attributed to the difference in the fat content of the two products.

We claim:

1. A food product containing potatoes, finished by a process selected from the group consisting of deep-frying, frying, and baking with an addition of at least one of fat and fat substitutes, the food product at least partially containing a potato starch having an amylopectin content of at least 95%, and said potato starch contained in the food product being at least partially derived from potatoes in which amylose formation has been suppressed by a process selected from the group consisting of breeding, a molecular biological method, and a genetic engineering method.

2. The food product according to claim 1, wherein the amylopectin content is at least 98%.

3. The food product according to claim 1, wherein the food product is based on potatoes.

4. The food product according to claim 1, which comprises up to 30% less of said at least one of fat and fat substitutes, as compared to a corresponding conventional food product.

5. A method of producing a food product, which comprises providing a potato starting material comprised at least partially of potatoes in which amylose formation has been suppressed by a process selected from the group consisting of breeding, a molecular biological method, and a genetic engineering method, the potatoes having a potato starch with an amylopectin content of at least 95%, and finishing the food product with a process selected from the group consisting of deep-frying, frying, and baking with an addition of at least one of fat and fat substitutes.

6. The method according to claim 5, which comprises providing a potato starting material at least partially comprised of potatoes having a starch with an amylopectin content of at least 98%.

7. The method according to claim 5, which comprises using as the potato starting material raw potatoes reduced to fragments.

8. The method according to claim 5, which comprises using as the potato starting material, exclusively or partially, a potato material selected from the group consisting of boiled potatoes, mashed potatoes, dehydrated boiled potatoes, and dehydrated mashed potatoes.

9. The method according to claim 5, which comprises using as the potato starting material, exclusively or partially, dried potato pieces.

10. The method according to claim 5, which comprises using as the potato starting material, exclusively or partially, dried potato granules.

11. The method according to claim 5, which comprises using as the potato starting material, exclusively or partially, powderized potatoes.

12. The method according to claim 7, which comprises using as the potato starting material, exclusively or partially, a mixture of any of the members selected from the group consisting of raw potatoes reduced to fragments, boiled potatoes, mashed potatoes, dehydrated boiled potatoes, dehydrated mashed potatoes, dried potato pieces, dried potato granules, and powderized potatoes.

13. The method according to claim 5, wherein the food product is a product selected from the group consisting of potato chips and similar snack articles, dehydrated potato chips, and dehydrated forms of similar snack articles.

14. The method according to claim 5, wherein the food product is a product selected from the group consisting of French fries and similar products, and dehydrated forms of the French fries, and dehydrated forms of the similar products.

15. The method according to claim 5, wherein the food product is a product selected from the group consisting of potato croquettes and similar products, and dehydrated forms of said potato croquettes, and dehydrated forms of the similar products.

16. The method according to claim 5, wherein the food product is a product selected from the group consisting of potato pancakes and similar products, and dehydrated forms of the potato pancakes, and dehydrated forms of the similar products.

* * * * *